United States Patent [19]

Fehrenbach et al.

[11] Patent Number: 5,035,513
[45] Date of Patent: Jul. 30, 1991

[54] FLUORESCENT MATERIAL TEMPERATURE SENSOR

[75] Inventors: Gustav W. Fehrenbach, Hanau; Doris Peukert, Hofheim, both of Fed. Rep. of Germany

[73] Assignee: Degussa AG, Frankfurt am Main, Fed. Rep. of Germany

[21] Appl. No.: 463,377

[22] Filed: Jan. 11, 1990

[30] Foreign Application Priority Data

Jan. 24, 1989 [GB] United Kingdom ............... 3902001

[51] Int. Cl.$^5$ .................. G01J 5/02; G01K 11/20
[52] U.S. Cl. ..................... 374/161; 250/461.1; 252/962
[58] Field of Search ............ 374/161, 131, 130, 123, 374/126; 252/962; 250/368, 461.1

[56] References Cited

U.S. PATENT DOCUMENTS

| | | | |
|---|---|---|---|
| 3,932,881 | 1/1976 | Mite et al. | 357/74 X |
| 4,560,286 | 12/1985 | Wickersheim et al. | 250/461.1 X |
| 4,626,110 | 12/1986 | Wickersheim et al. | 374/161 X |
| 4,789,992 | 12/1988 | Wickersheim et al. | 374/131 X |
| 4,794,619 | 12/1988 | Tregay | 374/131 |
| 4,885,471 | 12/1989 | Telfair et al. | 250/461.1 |
| 4,916,319 | 4/1990 | Telfair et al. | 250/461.1 |

FOREIGN PATENT DOCUMENTS

| | | |
|---|---|---|
| 1184864 | 4/1961 | Fed. Rep. of Germany . |
| 3732217A1 | 4/1988 | Fed. Rep. of Germany . |
| 449666 | 9/1985 | Sweden . |

OTHER PUBLICATIONS (WIPO) International Publication No. WO 87/02769, published 5/7/87, "Fiberoptic Sensing of Temperature and/or other Physical Parameters", pp. 1–39, and four (4) sheets, Luxtron Corp.
Allied Physics Letter–Vol. 11, Jul. 15, 1967–*A New Phosphor for Flying Spot Cathode Ray Tubes for Color Television*: Yellow-emitting $Y_aAl_5O_{12}$-$CE^{3+}$ (pp. 53–55), authors G. Blasse and A. Bril.

Primary Examiner—Daniel M. Yasich
Attorney, Agent, or Firm—Beveridge, DeGrandi & Weilacher

[57] ABSTRACT

A fluorescent material is suggested whose decay time is used more particularly for determining a temperature. Said fluorescent material consists of pulverized crystals. The grain size of the pulverized and homogenized material is preferably <40 μm.

2 Claims, 1 Drawing Sheet

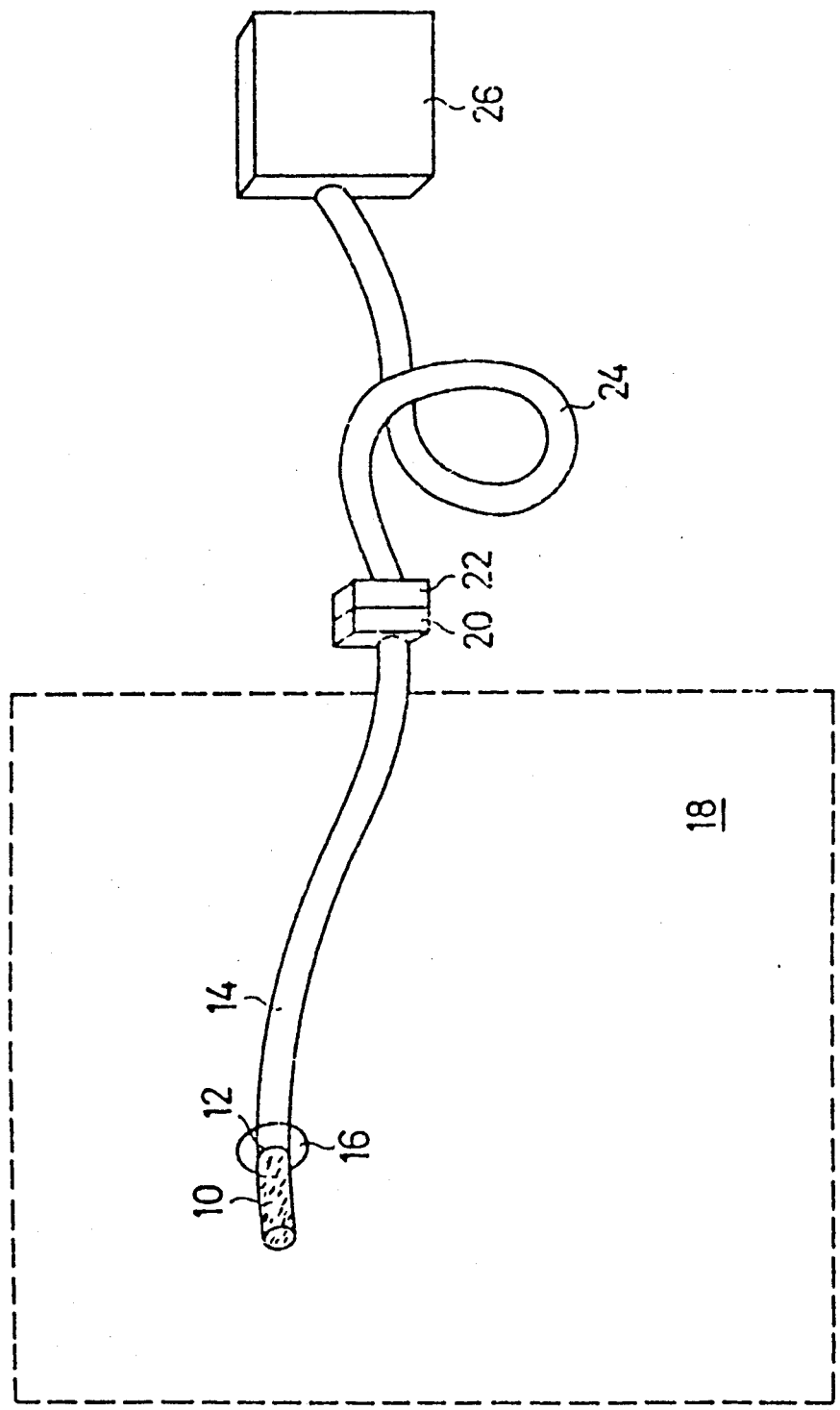

FLUORESCENT MATERIAL TEMPERATURE SENSOR

DESCRIPTION

The invention relates to the use of fluorescent material whose decay time depends on a physical quantity such as temperature and which, preferably through a light wave guide, is optically connected to a device disposed to generate exciting radiation and to detect and evaluate received radiation. The invention also relates to a process for making fluorescent material.

In order more particularly to determine temperatures in one location and to evaluate such temperatures in another location, fiber-optical sensors provided with a fluorescent substance are known whose decay time permits to derive a statement about temperature. Well-known fluorescent materials are crystals or glasses in which one or several elements from the series of transition elements and/or rare earths are stoichiometrically included or doped. In selecting crystals or glasses for practical applications care must be taken to see that the decay time of identical fluorescent substances remains unchanged within the admissible error limits. For example, chromium-doped aluminum oxide crystals such as ruby crystals display great changes of decay times as the chromium ion concentration varies. A high chromium ion concentration is however desirable to obtain higher signal levels allowing a high measuring accuracy of the decay times and the corresponding changes.

In DE-OS No. 37 32 217 published Apr. 14, 1988, a fluorescent substance is described in the form of a crystal which is a chromium-doped yttrium aluminum garnet (YAG). Such crystals are pulled by the expensive Czochralsky method. The single crystals so pulled are then cut up into sensor crystals. To ensure exchangeability of the sensors, the individual crystals must be carefully selected because the chromium concentration of the single crystals pulled by the Czochralsky method is not constant. As aforesaid, constant concentration must however be guaranteed to obtain reproducible signals.

It is the task of the present invention to provide a fluorescent material which is easy to make and has an ion concentration consistent within permissible error limits, said ion concentration affecting the decay time, with the concentration itself to be higher when compared to crystals as grown by the Czochralski technique.

The task according to the invention is substantially characterized in that the fluorescent material consists of pulverized crystals, with the grain size of the individual powder grains being smaller than 40 $\mu$m.

The fluorescent material according to the invention can be used to produce exchangeable sensors, without selection, from inhomogeneous single crystals, said single crystals being reduced to fine-grained powder and subsequently homogenized. This provides small depth of penetration of the exciting radiation in the fine-grained powders through multiple reflection and scatter processes and so produces an adequate sensor signal without the classical light wave guide effect, said effect being used in the case of compactly cut single sensor crystals which inherently work as light wave guides. As an adequate sensor signal is obtained from the pulverized and homogenized fluorescent material, it follows that the expensive growth of large single crystals is not needed.

The fluorescent material is preferably a chromium-doped yttrium aluminum garnet (YAG), with a chromium concentration between 1 through to 10 atomic weight (at %).

A process for making fluorescent material is characterized in that said fluorescent material is obtained by a tempering process. The fluorescent material may consist of stoichiometrically weighed start material such as $Cr_2O_3$, $Al_2O_3$ and $Y_2O_3$ and be tempered over a time span of 24 hours at a temperature of about 1400° C. This will produce adequate homogeneity of the crystal powder allowing the chromium concentration to be increased to 1 through 10 at %.

Instead of CR:YAG powder, other sensor materials, which in the form of compact single crystals are used in fiber-optical luminescence sensors, may be obtained by suitable process steps, that is, by homogenization of fine-grained, powder-like start materials by tempering. Reference is made by way of example to $Cr:Al_2O_3$ or Nd, Yb:YAG.

Further details, advantages and characteristics of the invention result not only from the claims, the characteristics derived therefrom—singly and/or in combination—but also from the following description of a preferred embodiment shown in the drawing.

In the only Figure a sensor (10) is shown consisting of a capsule of fluorescent material which is made up of pulverized and homogenized single crystals (12). The grain size of the fine-grained power is preferably <40 $\mu$m. A suitable fluorescent material is chromium-doped yttrium aluminum garnet (Cr:YAG), with the chromium concentration of 1 through 10 at %. In the embodiment the sensor (10) is connected to the light wave guide through, for example, a glass soldier (16). Sensor (10) and light wave guide (14) are in a room (18) whose temperature will be determined in terms of the decay time of the fluorescent material. Outside the room, the light wave guide is connected to a plug-in element (20) of a plug-in connector used for light wave guides. The other plug-in element (22) of the plug-in connector is connected to the end portion of a second light wave guide (24). The light wave guide (22), in turn, is connected to a device disposed to generate exciting radiation and to detect and evaluate the radiation of the sensor (10), said radiation transmitted through the first and second light wave guides (14) and (24). Device (26) is used to measure the decay time of radiation emitted from the fluorescent material (12).

Instead of the Cr:YAG material, other pulverized fluorescent materials homogenized by tempering may be used, said materials known to be used in fiber-optical luminescence sensors. Reference is made by way of example of $Cr:Al_2O_3$ or Nd, Yb:YAG.

We claim:

1. Use of a fluorescent material, whose decay time is temperature-dependent, for determining the temperature in a room or body, said fluorescent material being optically connected, through a light wave guide, to a device disposed to generate exciting radiation and to detect and evaluate received radiation, wherein said fluorescent material is filled in a capsule connected to said light wave guide and said fluorescent material consists of homogeneously pulverized inhomogeneous single crystals and said fluorescent material has a grain size below 40 $\mu$m.

2. Use as defined in claim 1, characterized in that the fluorescent material consists of homogenized chromium-doped yttrium aluminum garnet in which the chromium concentration is preferably 1 through 10 at %.

* * * * *